United States Patent
Strassenberger et al.

(10) Patent No.: US 10,343,091 B2
(45) Date of Patent: Jul. 9, 2019

(54) FILTER ELEMENT, FILTER, AND FILTER SYSTEM WITH RETURN LINE BYPASS

(71) Applicant: MANN+HUMMEL GMBH, Ludwigsburg (DE)

(72) Inventors: Norbert Strassenberger, Adlkofen (DE); Kathrin Tschepe, Deggendorf (DE); Heiko Wyhler, Stuttgart (DE); Christian Kocksch, Roemerberg (DE); Christopher Banks, Freiburg (DE); Martin Postel, Hassloch (DE); Christian Thalmann, Speyer (DE); Frank Pflueger, Sachsenheim (DE); Christine Oprisch, Oberriexingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 88 days.

(21) Appl. No.: 15/467,731

(22) Filed: Mar. 23, 2017

(65) Prior Publication Data
US 2017/0189838 A1    Jul. 6, 2017

Related U.S. Application Data

(63) Continuation of application No. PCT/EP2015/071853, filed on Sep. 23, 2015.

(30) Foreign Application Priority Data

Sep. 24, 2014  (DE) .......................... 10 2014 013 852

(51) Int. Cl.
*B01D 35/147*  (2006.01)
*B01D 35/16*  (2006.01)
(Continued)

(52) U.S. Cl.
CPC ....... *B01D 35/1475* (2013.01); *B01D 27/106* (2013.01); *B01D 29/11* (2013.01);
(Continued)

(58) Field of Classification Search
CPC ...... B01D 27/016; B01D 29/11; B01D 29/21; B01D 29/668; B01D 35/1475; B01D 35/153; B01D 35/16; B01D 2201/167
See application file for complete search history.

(56) References Cited

U.S. PATENT DOCUMENTS 4,954,252 A * 9/1990 Griffin .................. B01D 35/15
137/512.4
4,959,141 A * 9/1990 Anderson ............ B01D 27/106
137/549
(Continued)

FOREIGN PATENT DOCUMENTS

CN         103480190 A     1/2014
DE     102005041037 A1     4/2007
(Continued)

*Primary Examiner* — Terry K Cecil
(74) *Attorney, Agent, or Firm* — James Hasselbeck

(57) ABSTRACT

A filter element has a filter material defining a raw side and a clean side of the filter element and to be flowed through by a medium to be filtered from the raw side to the clean side. A non-return element is disposed on the filter material. The non-return element allows a return flow of the filtered medium from the clean side back to the raw side and prevents a flow of the unfiltered medium from the raw side to the clean side. A filter and a filter system with such a filter element are disclosed. The filter system has a pump to supply medium to be filtered to the filter.

10 Claims, 3 Drawing Sheets

(51) Int. Cl.
*B01D 29/66* (2006.01)
*B01D 35/153* (2006.01)
*B01D 29/11* (2006.01)
*B01D 27/10* (2006.01)
*B01D 29/21* (2006.01)

(52) U.S. Cl.
CPC ........... *B01D 29/21* (2013.01); *B01D 29/668* (2013.01); *B01D 35/153* (2013.01); *B01D 35/16* (2013.01); *B01D 2201/167* (2013.01)

(56) References Cited

U.S. PATENT DOCUMENTS

| | | | |
|---|---|---|---|
| 5,868,931 A * | 2/1999 | Janik | B01D 35/26 210/117 |
| 6,835,235 B2 * | 12/2004 | Pilgram | B01D 35/02 210/496 |
| 2005/0077230 A1 | 4/2005 | Guenter | |
| 2006/0113227 A1 * | 6/2006 | Mckenzie | B01D 27/103 210/130 |
| 2012/0132582 A1 | 5/2012 | Glueck | |

FOREIGN PATENT DOCUMENTS

| | | |
|---|---|---|
| DE | 102009061063 A1 | 6/2011 |
| DE | 102012017140 A1 | 3/2014 |
| EP | 1648583 B1 | 4/2006 |
| WO | 2013092010 A2 | 6/2013 |

\* cited by examiner

FILTER ELEMENT, FILTER, AND FILTER SYSTEM WITH RETURN LINE BYPASS

CROSS-REFERENCE TO RELATED APPLICATIONS

This application is a continuation application of international application No. PCT/EP2015/071853 having an international filing date of 23 Sep. 2015 and designating the United States, the international application claiming a priority date of 24 Sep. 2014, based on prior filed German patent application No. 10 2014 013 852.6, the entire contents of the aforesaid international application and the aforesaid German patent application being incorporated herein by reference

BACKGROUND OF THE INVENTION

The invention concerns a filter element comprising a filter material, wherein the filter material can be flowed through from a raw side to a clean side by a medium to be filtered. The invention concerns moreover a filter as well as a filter system.

It is known to employ filters for filtering a medium, in particular for filtration of a liquid.

For example, EP 1 648 583 B1 discloses an oil filter. The oil filter comprises a filter element with an overflow valve. When the pressure is too high in the inlet, overflow or bypassing of a filter material of the filter element occurs in the known oil filter. In this context, the overflow valve opens in order to enable direct flow of the oil from the raw side to the clean side of the filter.

When filters are used outdoors, in particular in a motor vehicle, a great change of the outdoor temperature may cause a volume change of the medium, in particular freezing of the medium in the form of a liquid when the outdoor temperature drops. The volume change can lead to the filter becoming damaged.

In order to avoid such a filter damage, it is disclosed in DE 10 2012 017 140 A1 to employ a compensation element in the filter which compensates the volume change of the medium in the filter. Such a compensation element requires however a relatively large installation space in the filter.

Therefore, a compensation element is often not employed in filters and the medium after completion of filtration is pumped out of the filter in order to avoid damage to the filter by temperature changes. In particular, as mentioned before, damage to the filter by a medium freezing in the filter is to be avoided.

Pumping out the medium has however the disadvantage that dirt particles in the filter material become detached and are also pumped out. This can cause damage to the pump or to the throttles, valves, and the like.

SUMMARY OF THE INVENTION

It is the object of the invention to provide a filter element, a filter, and a filter system that enable pumping out the medium without dirt discharge from the filter material.

The object according to the invention is solved by a filter element comprising a filter material, wherein the filter material can be flowed through from a raw side to a clean side of the filter element, wherein the filter element comprises a non-return element that is embodied such that a return flow of filtered medium from the clean side back to the raw side is possible but no flow of unfiltered medium from the raw side to the clean side.

The dependent claims provide expedient further embodiments.

The non-return element enables thus at least a portion of the medium to bypass the filter material. A strong "reverse" flow through the filter material, i.e., a strong through the filter material from the clean side to the raw side is prevented thereby. As a consequence, dirt discharge from the filter material can be prevented.

The filter element comprises preferably the raw side at its exterior side and the clean side at its interior side. In other words, the filter element preferably has an exterior raw side and an interior clean side. The filter element can therefore be constructed particularly simply.

The filter element is preferably embodied in the form of a filter element for a liquid, in particular in the form of a filter element for aqueous urea solution.

The filter element is preferably embodied in the form of a round filter element. The filter material in this context is preferably folded in a star shape in order to provide a large surface area.

Particularly preferred, the inflow of the medium to be filtered is radial to the filter material, i.e., perpendicular to the central filter element longitudinal axis, and the outflow of the filtered medium is axial, i.e., in the direction of or parallel to the central filter element longitudinal axis.

In a particularly preferred embodiment of the invention, the non-return element and the filter material are matched to each other in such a way that the flow resistance of the non-return element upon return flow of filtered medium from the clean side to the raw side is smaller than the flow resistance of the filter material upon return flow of filtered medium from the clean side back to the raw side. Therefore, upon pumping, the medium will bypass substantially completely the filter material by means of the non-return element so that dirt discharge from the filter material is practically completely avoided. In this context, the flow resistance relates preferably to aqueous urea solution.

The filter element may comprise a first end disk, wherein the non-return element is arranged or embodied in the area of the first end disk. Particularly preferred, the non-return element is arranged immediately on the first end disk. In this way, a particularly space-saving arrangement of the non-return element is realized.

Further preferred, the filter material is framed axially by the first end disk and a second end disk of the filter element. The filter material can be fused and/or glued to the end disks in order to be able to withstand high pressures. In this context, the filter material during manufacture of the filter element can be introduced into the melt of the end disks and/or into an adhesive applied to the end disks.

The non-return element can be configured as a check valve. In particular, the non-return element can comprise a first through opening for flow of the medium from the clean side to the raw side, wherein non-return element can comprise a blocking body for closing off the first through opening. In this context, when the pressure of the medium at the raw side is higher than at the clean side, the blocking body can rest on a stop of the non-return element and thereby close off the first through opening and, on the other hand, can at least partially open the first through opening partially when the pressure of the medium at the clean side is greater than at the raw side. In this context, the blocking body can be in the form of a flap, a ball, a cone or the like. The first through opening is preferably embodied in the first end disk.

In order to safely ensure the return flow of the medium from the clean side to the raw side, a plurality of non-return elements can be provided. The non-return element or the non-return elements can comprise a plurality of through openings that each are closable and openable by a blocking body. Preferably, a single blocking body closes off and opens all through openings of the non-return element or an individual blocking body, respectively, closes off and opens all through openings of the respective non-return elements. The through openings can be embodied in the first end disk.

The blocking body is preferably embodied in the form of a diaphragm which covers at the raw side of the filter element the first through opening. A diaphragm, in particular a monolithic diaphragm, is particularly simply and inexpensively producible.

In a further embodiment of the non-return element, the diaphragm is made of silicone or of synthetic rubber, in particular of ethylene propylene diene rubber (EPDM). These materials enable a simple manufacture of the diaphragm and at the same time provide a long service life. Particularly preferred, the diaphragm is formed of hydrogenated acrylonitrile butadiene rubber (HNBR) because this material is characterized by a particularly high mineral oil resistance and in particular by a particularly high diesel fuel resistance.

In order to ensure reliably the seal-tightness of the non-return element with regard to flow from the raw side to the clean side, the blocking body is preferably pressed by an elastic element against the first through opening. Particularly preferred, in this context the diaphragm surface is at least partially pressed by an elastic element against the first through opening.

The elastic element can be in the form of a spring. Particularly preferred, the elastic element is embodied in the form of the diaphragm body. In this way, a separate elastic element is not needed.

For attachment of the diaphragm, it can be provided with a locking projection wherein the locking projection is fastened in a locking cutout of the non-return element. The locking cutout is preferably embodied as a through cutout so that the locking projection engages from behind the locking cutout.

A constructively particularly simple embodiment of the non-return element is provided when the diaphragm is formed to have axial symmetry, in particular rotation symmetry, relative to the central longitudinal axis of the locking cutout.

The non-return element according to the invention can also be provided with a different constructive configuration and, for example, can be formed as a so-called duckbill valve. Such a valve is obtainable ready-made and inexpensively on the market and can be particularly easily mounted on the filter element.

One or more of the non-return elements may comprise one or more of the afore described features.

According to a further embodiment of the invention, the filter element comprises, in addition to the afore described non-return element, a check valve by means of which during a backflushing process (=purging) of the filter or of the filter element an undesirable return flow of the filtered medium or of air through the filter material (=filter medium) is prevented. In this way, on the one hand, an undesirable detachment of contaminants adhering to the filter material at the raw side can be counteracted even more reliably. Moreover, in this way, a reliable response behavior of the non-return element in respect to pressure reversal between clean side and raw side even for minimal pressure differentials can be realized. The check valve together with the non-return element can be arranged on the same end disk of the filter element. The check valve can be designed in particular in a way so as to correspond to the non-return element.

The object of the invention is further solved by a filter comprising a filter housing and a filter element arranged in the filter housing, wherein the filter element comprises a filter material which can be flowed through from a raw side to a clean side of the filter by the medium to be filtered, wherein the filter comprises a non-return element that is embodied such that a return flow of filtered medium from the clean side to the raw side is possible but no flow of unfiltered medium from the raw side to the clean side.

The filter element comprises preferably the raw side at its exterior side and the clean side at its interior side. The filter element can therefore be constructed particularly simply.

The non-return element can thus be provided in the filter element and/or in another area of the filter, in particular in the filter housing. Preferably, the filter according to the invention comprises a filter housing and an afore described filter element arranged in the filter housing, wherein the filter element comprises the non-return element. When the filter element comprises the non-return element, a filter can be retrofitted with the "bypass function" of the non-return element in that simply the conventional filter element is replaced with a filter element according to the invention. The conventional filters can be easily retrofitted with such a "bypass function" in this way.

The non-return element of the filter comprises preferably one or several of the afore described features. Moreover, on the filter a plurality of non-return elements can be provided that comprise one or several of the afore described features.

The object according to the invention is finally solved by a filter system with an afore described filter and a first pump for supply of medium to be filtered to the filter. The first pump can be designed for pumping the medium out of the filter. Alternatively or additionally, the filter system can comprise a second pump for pumping out medium from the filter. The filter system can furthermore comprise a valve, in particular a shut-off valve and/or a throttle that is connected fluidically between the pump and the filter.

BRIEF DESCRIPTION OF THE DRAWINGS

Further features and advantages of the invention result from the following detailed description of embodiments of the invention, from the drawing showing details important to the invention, as well as from the claims.

The features illustrated in the drawing are illustrated in such a way that the particularities according to the invention are clearly shown. The different features can be realized individually by themselves but also several of them in any combination in variants of the invention.

DESCRIPTION OF PREFERRED EMBODIMENTS

Figure 1:
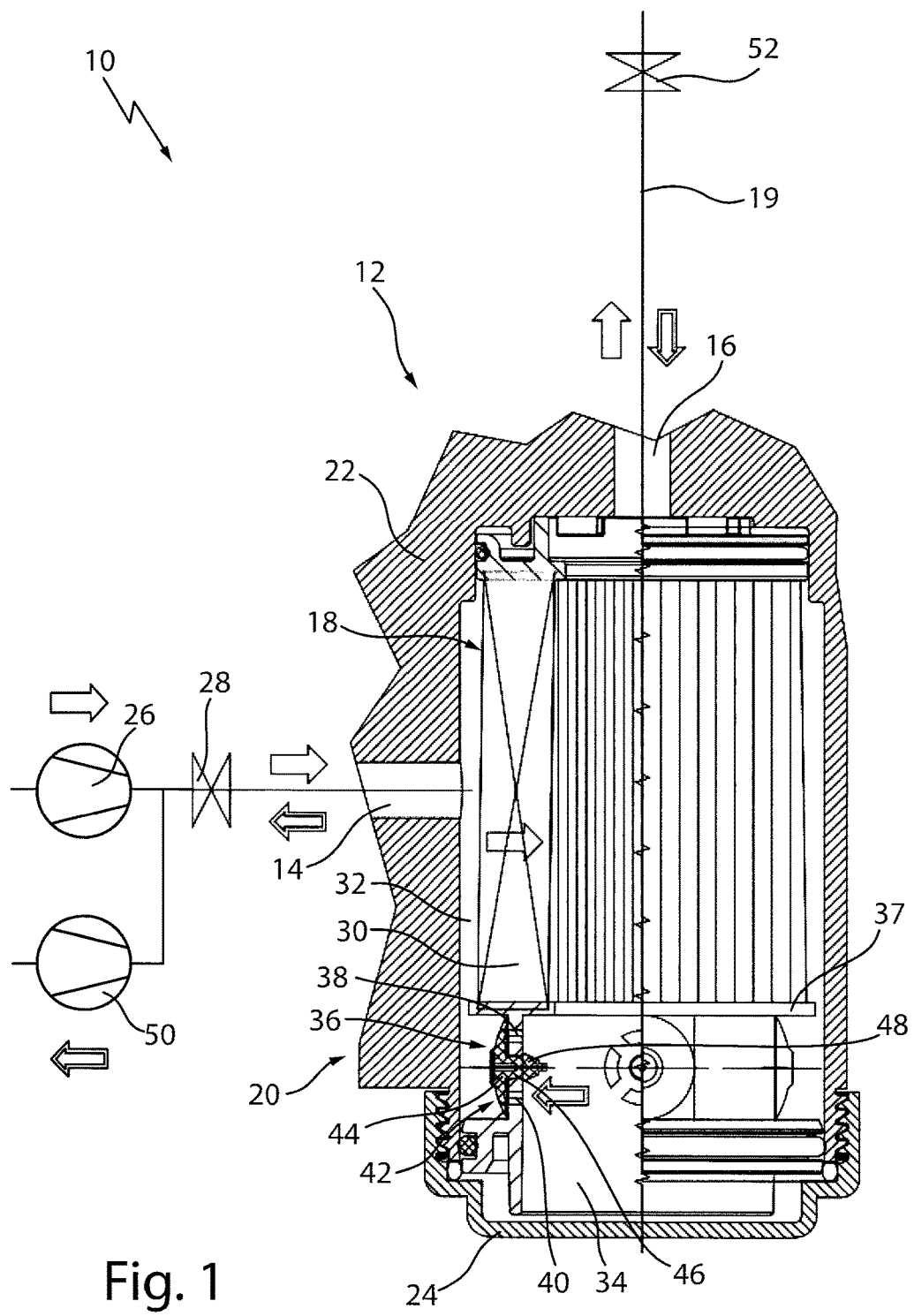
FIG. 1 shows in this context a view of a filter system according to the invention with a filter, wherein the filter is shown in section in one half of the view and the other components of the filter system are illustrated schematically.

FIG. 1 shows a filter system 10 with a filter 12. The filter 12 is in the form of a filter for aqueous urea solution. It comprises an inlet 14 and an outlet 16. The inlet 14 extends radially, the outlet 16 axially to a filter element 18. The filter element 18 is in the form of a round filter, i.e., substantially is axial symmetrical to its central filter element longitudinal axis 19. The filter element 18 is arranged in a filter housing 20 of the filter 12. The filter housing 20 comprises a filter housing body 22 comprising the inlet 14 and the outlet 16. The filter housing body 22 is preferably connected fixedly with a motor vehicle. In order to enable an exchange of the filter element 18, the filter housing body 22 is reversibly connected with a cover 24 of the filter housing 20 so as to be detachable.

By means of a first pump 26, medium to be filtered, in this case aqueous urea solution that is to be filtered, can be supplied to the filter 12. The path of the medium to be filtered is shown in FIG. 1 by single line arrows. In this context, the medium to be filtered passes a first shut-off valve 28 on its way to the filter 12.

The filter element 18 comprises a filter material 30 for filtering dirt particles. The filtered dirt particles remain in the filter material 30. The filter material 30 separates thus a raw side 32 of the filter element of the filter 12 from its clean side 34.

Between raw side 32 and clean side 34, a non-return element 36 is provided. The non-return element 36 is embodied on a first end disk 37 of the filter element 18. The non-return element 36 comprises a first through opening 38, a second through opening 40, and a diaphragm 42. The non-return element 36 comprises, in addition to the through openings 38, 40, two further through openings which are arranged symmetrical to the through openings 38, 40 but are not visible in the present section view. On the raw side 32, the diaphragm 42 is resting with an umbrella-shaped head part 44 on the through openings 38, 40 in order to close them off. The diaphragm 42 is passed through a locking cutout 46 formed as a through cutout. A locking projection 48 of the diaphragm 42 is fastened in the locking cutout 46 in that it engages from behind the locking cutout 46. The diaphragm 42 is formed of an elastic material, wherein it closes off the through openings 38, 40 when the pressure at the raw side 32 is higher than the pressure at the clean side 34 and opens them when the pressure at the clean side 34 is higher than the pressure at the raw side 32.

In this way, filtered medium can be guided from the clean side 34 to the raw side 32 by means of the non-return element 36 without the filtered medium passing through the filter material 30. Medium that is contained in the filter 12 can thus be pumped out by a second pump 50 from the filter 12 without dirt particles separated in the filter medium 30 becoming detached and the first shut-off valve 28 and/or the second pump 50 becoming soiled and damaged. Pumping out the medium is realized in the direction of the illustrated double-line arrows.

The filter system comprises a second shut-off valve 52 which, in relation to the filter 12, is fluidically downstream of the outlet 16. For pumping, the second shut-off valve 52 is closed and the first shut-off valve 28 opened in order to empty the filter 12 completely. Subsequently, the first shut-off valve 28 is closed. By emptying the filter 12, damage to the filter 12 by freezing of medium in the filter is prevented. It is understood that the second shut-off valve 52 may also stay open when pumping out the medium in order to allow flow of air (or exhaust gases of an internal combustion engine) through the outlet 16 into the filter housing 20.

Figure 2:
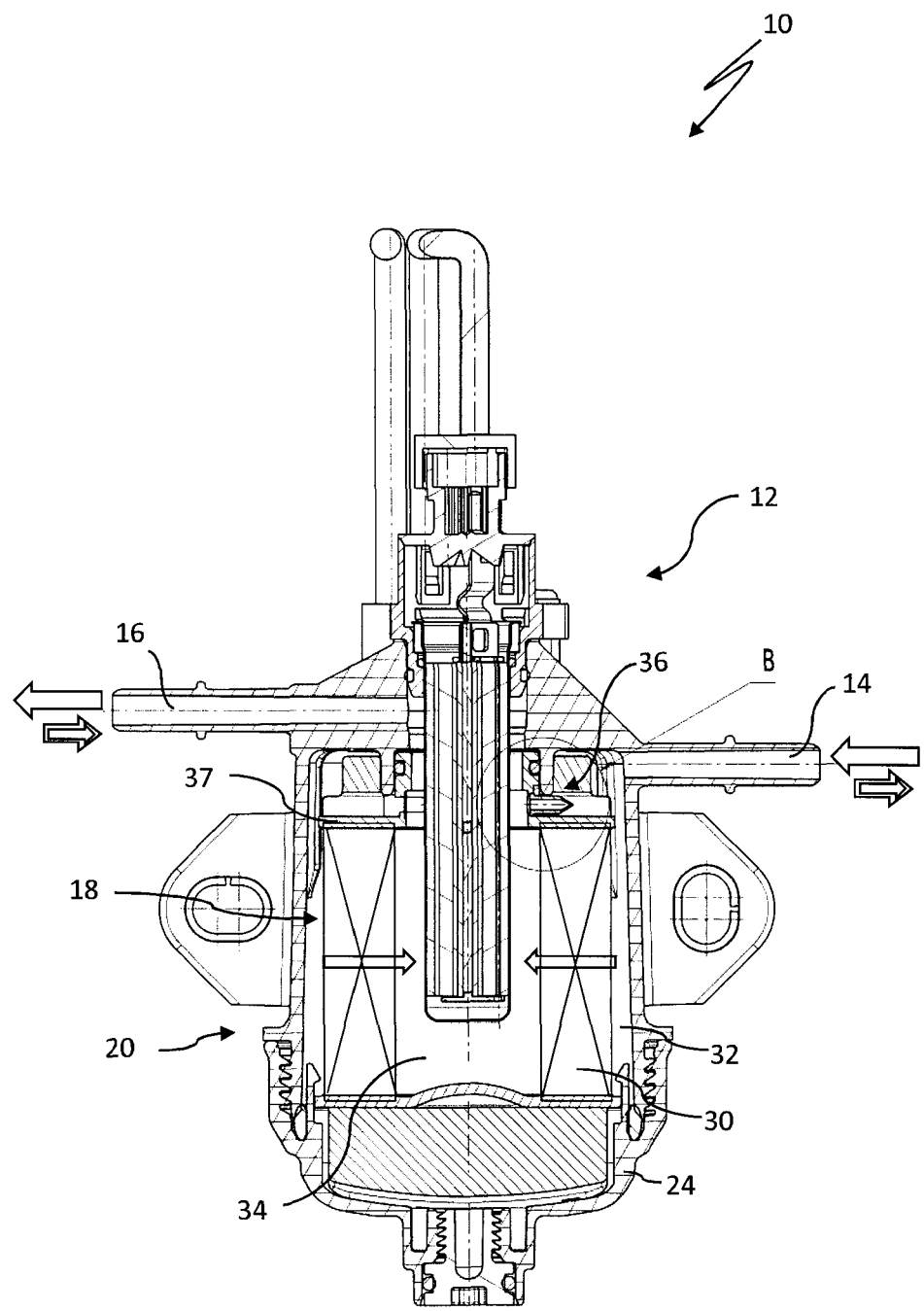
FIG. 2 shows a further filter system with a filter in a detail longitudinal section.

The filter element 18 can be arranged in the filter housing 20 in principle also with the first end disk 37 facing upwardly, as is the case in the embodiment of the filter system 10 illustrated in FIG. 2. It is understood that the non-return element 36 which is embodied on the first end disk 37 of the filter element 18 moreover can have a different configuration than the embodiment illustrated in FIG. 1.

Figure 3:
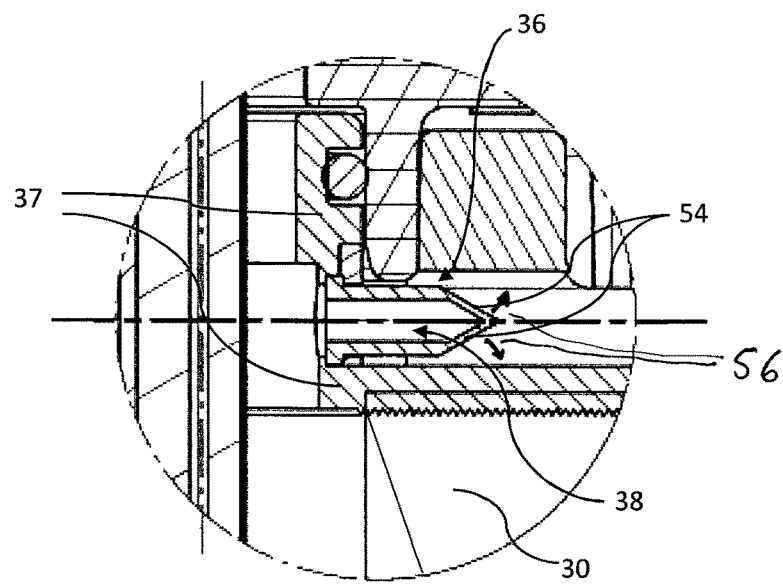
FIG. 3 shows the detail B identified in FIG. 2 of the filter system in an enlarged illustration.

Accordingly, the non-return element 36 can be, for example, in accordance with FIGS. 2 and 3, a so-called duckbill valve. The non-return element 36 extends in this case preferably through a cutout of the first end disk 37 of the filter element 18. The non-return element 36 forms in this context a through opening 38 for the medium which, according to the detail illustration of the duckbill valve in FIG. 3, can be fluid-tightly closed by means of two valve flaps 54 of the duckbill valve. At a higher pressure at the raw side 32 than at the clean side 34, the two valve flaps 54 of the non-return element 36 are resting fluid-tightly against each other. The duckbill valve is thus in its closed position in which the through opening 38 of the duckbill valve is fluid-tightly shut. In the closed position of the duckbill valve, a bypass flow of the medium to be filtered around and about the filter medium 30 is prevented. When the pressure at the clean side 34 is higher than the pressure at the raw side 32, i.e., when blowing out or sucking off the aqueous urea solution from the inlet 14, the outlet 16 as well as the filter housing 20 (FIG. 3), the two valve flaps 54 of the non-return element 36 are moved apart, as is illustrated in FIG. 3 by arrows 56, and the non-return element 36 is thus transferred into its open position.

Figure 4:
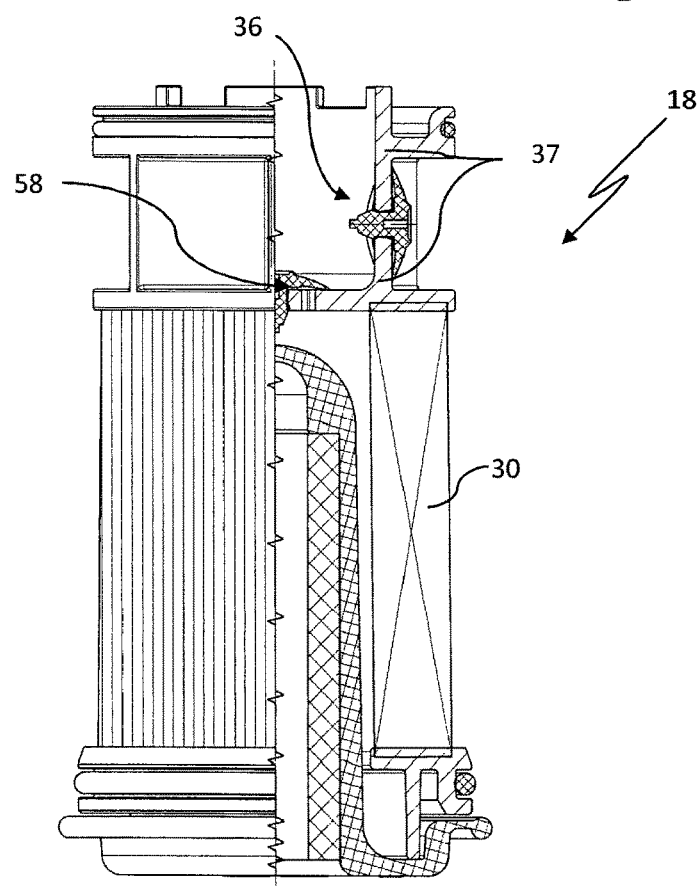
FIG. 4 shows a filter element for a filter system, in particular for an aqueous urea solution, in a partial longitudinal section.

According to the embodiment of FIG. 4, the filter element 18 can comprise, in addition to the afore explained non-return elements 36, a check valve 58 by means of which a return flow of the filtered medium or an incoming air flow through the filter element 30 is completely prevented upon discharge of the aqueous urea solution from the filter system (=purging). In this way, unwanted detachment of dirt that has been filtered from the medium by the filter material 30 can be even more reliably counteracted during the aforementioned backflushing process. The check valve 58 can be arranged in particular on the first end disk 37 of the filter element 18 and can be designed in a way corresponding to the non-return element 36. By means of such a check valve 58 an even more reliable response behavior of the non-return element 36 can be realized during the backflushing process, in particular for only minimal pressure differentials between the clean side 34 and the raw side 32. It is understood that a complete emptying of the medium from the filter element 18 by backflushing (=purging) is not realized in the embodiment of the filter element 18 shown in FIG. 4.

In summary, the invention concerns a filter for filtering a medium, in particular for filtering aqueous urea solution. The filter comprises a filter element with a filter material. The medium can be pumped out at least partially, in particular completely, from the filter without it having to pass through the filter material so that dirt that has been filtered out from the medium does not become detached from the filter material and is not pumped out. For this purpose, in the filter, in particular in the filter element, a non-return element is provided that blocks a flow of the medium from the raw side to the clean side of the filter but allows a flow of the medium from the clean side to the raw side of the filter. The non-return element is preferably in the form of a duckbill valve or a mushroom-shaped diaphragm. In this context, the diaphragm is anchored, further preferred, by a thicker portion at the base of the mushroom shape in a through cutout of the filter. The head part of the mushroom shape covers preferably at least a through opening of the filter for flow of medium from the clean side to the raw side.

What is claimed is:

1. A filter element comprising:

a filter material defining a hollow interior, a raw side and a clean side of the filter element and configured to be flowed through by a medium to be filtered from the raw side to the clean side;

a first end disk arranged on and connected to a first end of the filter material of the filter element;

wherein the first end disk has a first side arranged at the clean side of the filter element and in fluid communication with filtered medium at the clean side;

wherein the first end disk has an opposite second side arranged at the raw side of the filter element and in fluid communication with unfiltered medium at the raw side;

a non-return element fixed onto the first end disk outside of the hollow interior and configured to allow a return flow of the filtered medium from the clean side back to the raw side and configured to prevent a flow of the unfiltered medium from the raw side to the clean side, the non-return element comprising:

a first through opening extending through the first end disk from the clean side to the raw side;

a diaphragm arranged on the first end disk at the raw side so as to cover the first through opening at the raw side, preventing flow of the unfiltered medium from the clean side back to the raw side, wherein a diaphragm surface of the diaphragm is at least partially pressed by an elastic element of the non-return element against the through opening, wherein, in normal operation of the filter element, the fluid to be filtered flows from the raw side, through the filter medium, into an interior of the filter medium to the clean side;

wherein, in a return flow condition, the non-return element of the first end disk opens to allow the return flow of filtered medium from the clean side, through the non-return element outside of the filter material hollow interior and to the raw side such that the return flow does not pass though the hollow interior of the filter material.

2. The filter element according to claim 1, wherein
the non-return element comprises a first flow resistance for the return flow of the filtered medium from the clean side back to the raw side and
wherein the filter material comprises a second flow resistance for the return flow of the filtered medium from the clean side back to the raw side, wherein the first flow resistance is smaller than the second flow resistance.

3. The filter element according to claim 1, wherein
the diaphragm comprises a diaphragm body and
wherein the elastic element is the diaphragm body.

4. The filter element according to claim 1, wherein
the diaphragm comprises a locking projection and
wherein the non-return element comprises a locking cutout,
wherein the locking projection is fastened to the locking cutout.

5. The filter element according to claim 4, wherein
the diaphragm is embodied to have axis symmetry relative to a central longitudinal axis of the locking cutout.

6. The filter element according to claim 1, wherein
the non-return element is a duckbill valve.

7. The filter element according to claim 1, further comprising
a check valve preventing return flow of the filtered medium from the clean side to the raw side through the filter material.

8. The filter element according to claim 7,
wherein the check valve is arranged on the first end disk.

9. A filter comprising:

a filter housing;

a filter element arranged in the filter housing, wherein the filter element comprises a filter material defining a hollow interior, a raw side and a clean side of the filter element and configured to be flowed through by a medium to be filtered from the raw side to the clean side;

a first end disk arranged on and connected to a first end of the filter material of the filter element;

wherein the first end disk has a first side arranged at the clean side of the filter element and in fluid communication with filtered medium at the clean side;

wherein the first end disk has an opposite second side arranged at the raw side of the filter element and in fluid communication with unfiltered medium at the raw side;

a non-return element fixed onto the first end disk outside of the hollow interior and configured to allow a return flow of the filtered medium from the clean side back to the raw side and configured to prevent a flow of the unfiltered medium from the raw side to the clean side, the non-return element comprising:

a first through opening extending through the first end disk from the clean side to the raw side;

a diaphragm arranged on the first end disk at the raw side so as to cover the first through opening at the raw side, preventing flow of the unfiltered medium from the clean side back to the raw side, wherein, in normal operation of the filter element, the fluid to be filtered flows from the raw side, through the filter medium, into an interior of the filter medium to the clean side;

wherein, in a return flow condition, the non-return element of the first end disk opens to allow the return flow of filtered medium from the clean side, through the non-return element outside of the filter material hollow interior and to the raw side such that the return flow does not pass though the hollow interior of the filter material.

10. A filter system comprising
a filter according to claim 9 and further comprising
a pump for supply of the medium to be filtered to the filter.

* * * * *